United States Patent [19]

Hansen

[11] Patent Number: 4,580,691
[45] Date of Patent: Apr. 8, 1986

[54] HIGH FLOW PRESSURE RELIEF ASSEMBLY

[75] Inventor: Franklin A. Hansen, Raytown, Mo.

[73] Assignee: Continental Disc Corporation, Kansas City, Mo.

[21] Appl. No.: 690,685

[22] Filed: Jan. 11, 1985

[51] Int. Cl.$^4$ .................. G08B 17/02; F16K 17/40; B65D 25/00
[52] U.S. Cl. ................... 220/89 A; 137/68.1
[58] Field of Search .................. 220/89 A; 137/68 R

[56] References Cited

U.S. PATENT DOCUMENTS

| | | | |
|---|---|---|---|
| 3,635,234 | 1/1972 | Dawson | 137/68 R |
| 3,922,767 | 12/1975 | Solter | 220/89 A |
| 4,079,854 | 3/1978 | Shaw et al. | 137/68 R X |
| 4,119,236 | 10/1978 | Shaw et al. | 220/89 A |
| 4,207,913 | 6/1980 | Fike, Jr. | 137/68 R |
| 4,211,334 | 7/1980 | Witten et al. | 220/89 A |
| 4,269,214 | 5/1981 | Forsythe et al. | 137/68 R |
| 4,301,938 | 11/1981 | Wood et al. | 220/89 A |
| 4,342,988 | 8/1982 | Thompson et al. | 220/89 A X |
| 4,363,418 | 12/1982 | Matz | 220/89 A |
| 4,434,905 | 3/1984 | Ou et al. | 220/89 A |

FOREIGN PATENT DOCUMENTS 844284  8/1960  United Kingdom ............. 220/89 A

Primary Examiner—Steven M. Pollard
Attorney, Agent, or Firm—Litman, Day and McMahon

[57] ABSTRACT

A safety pressure relief assembly of the rupture disc type guards against pressure differentials, beyond a predetermined range in a vent system, and includes a relief disc perforated to permit reverse flow without rupture, a sealing disc positioned adjacent the relief disc and blocking positive flow through the perforations, a support member with a stay structure positioned to support the sealing disc nested within the relief disc, and a cutting member positioned to cut the sealing disc at a predetermined vacuum within the vent system. The relief disc has a concave surface and a convex surface. When a predetermined vacuum pressure differential is applied to the assembly, the sealing disc and the support structure are inverted to project away from the relief disc. During the inversion, the support structure is recessed between cutting blades of the cutting member and the sealing disc impacts the cutting blades and is cut thereby into a pattern having petals and a silhouette portion in the shape of the support structure. As fluid under pressure flows through the rupture disc assembly, the silhouette portion of the sealing disc is supported by the support structure and is located between the cutting blades. After cutting by the blades, the petal portions are no longer supported by the support structure and fold out of the way of the fluid to open channels or passageways through the rupture disc assembly and permit rapid equilibration of pressure between opposite sides of the system without loose portions of the assembly being formed.

20 Claims, 10 Drawing Figures

U.S. Patent   Apr. 8, 1986   Sheet 1 of 3   4,580,691
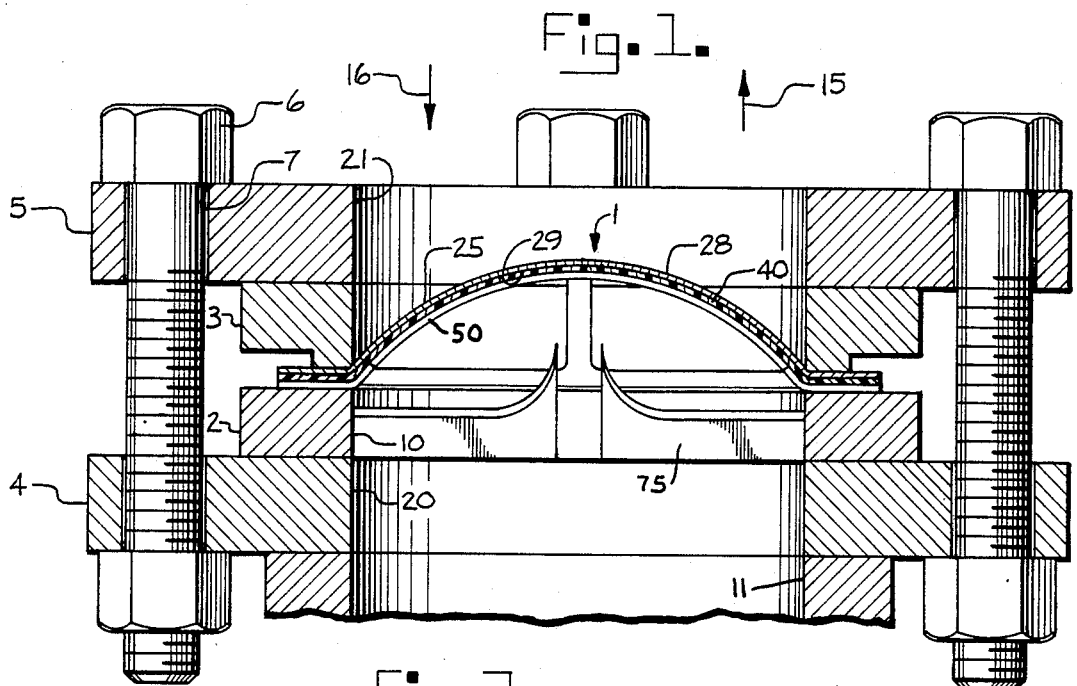
Fig. 1.
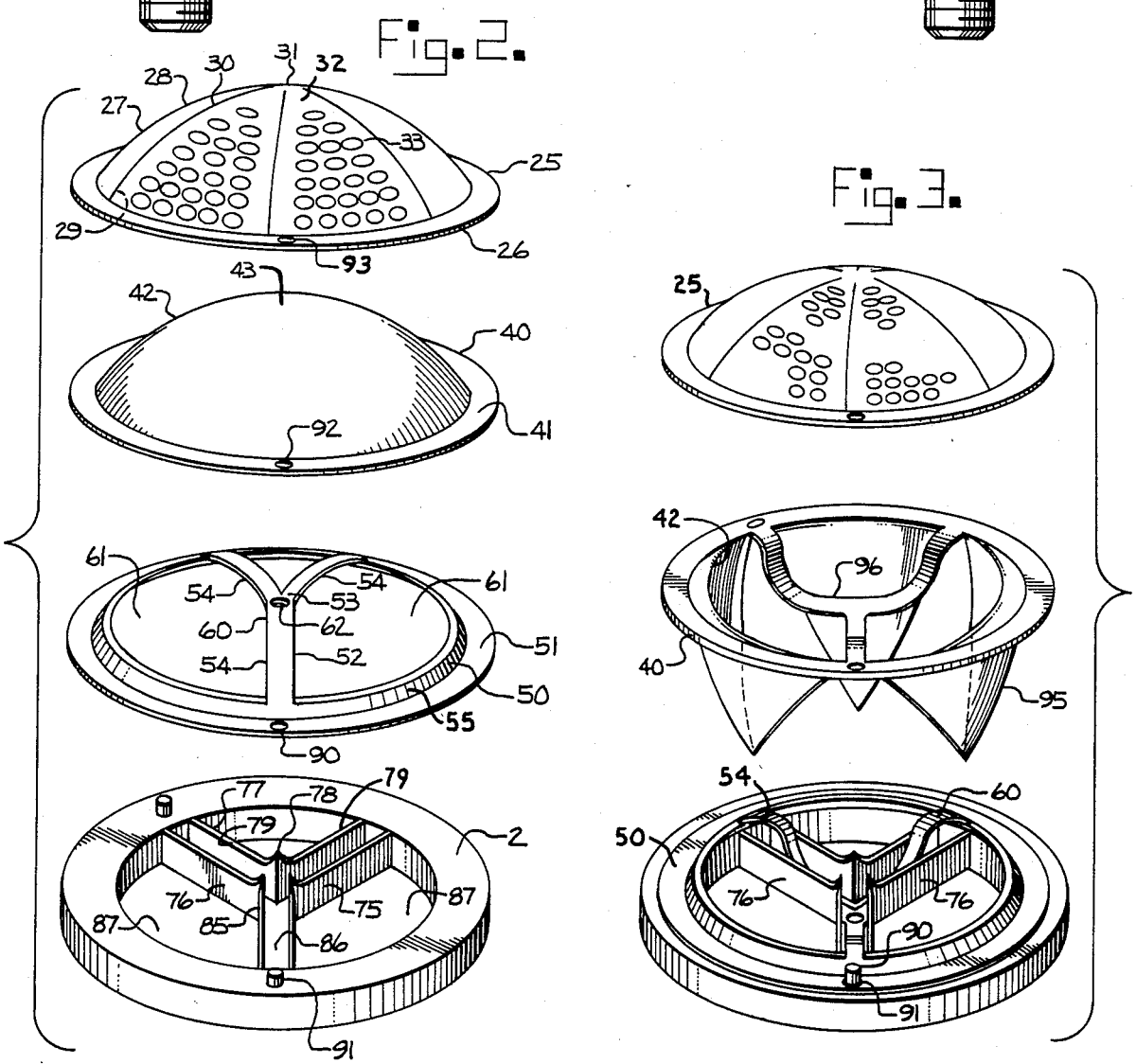
Fig. 2.
Fig. 3.

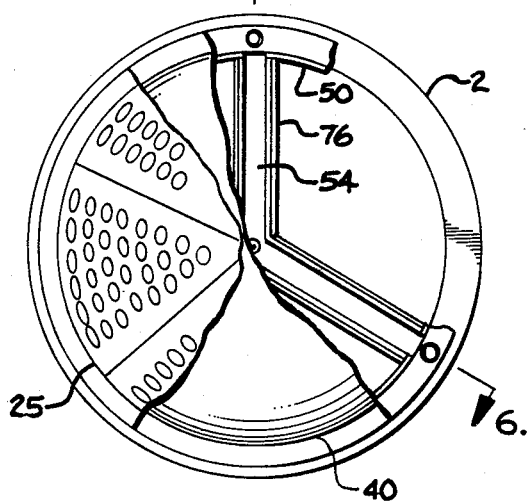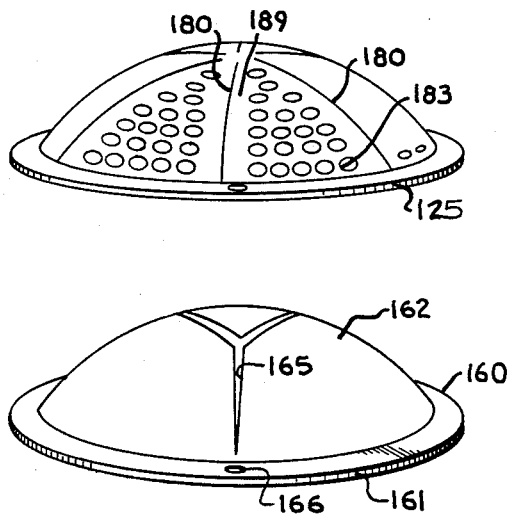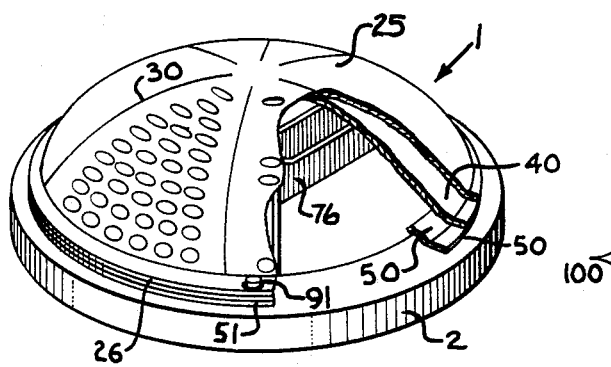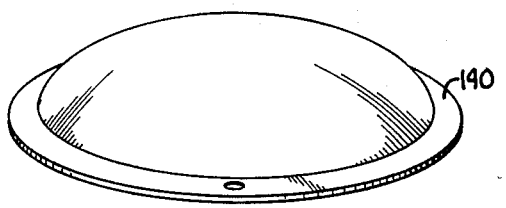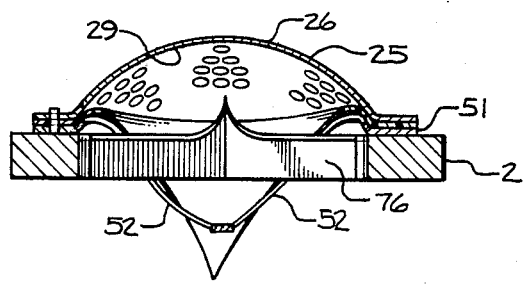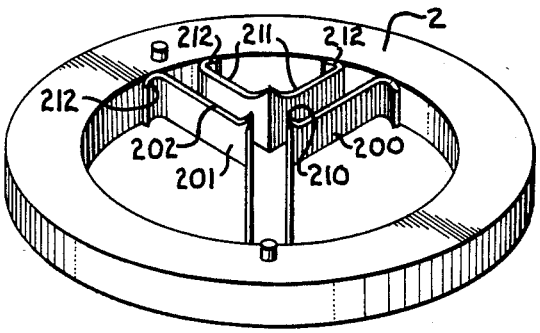

HIGH FLOW PRESSURE RELIEF ASSEMBLY

BACKGROUND OF THE INVENTION

The present invention relates to safety pressure relief devices and more particularly to improvements in rupture disc arrangements for protection against both excessive pressure and excessive vacuum and specifically for providing rapid equilibration of the pressure within a vessel, with the atmospheric pressure, when pressure inside that vessel has reached predetermined levels of positive or vacuum pressure, causing the rupture disc to break.

In recent years, rupture discs have found increasing use as a highly reliable pressure relief device designed primarily to guard against explosive conditions created when a vessel, for any reason, is subject to excessive internal pressure. In certain applications, the same vessel, for which overpressure protection is indicated, also requires protection against excessive negative guage pressures or a vacuum therein. For example, in the food processing and pharmaceutical manufacturing industries, relatively thin-walled stainless steel tanks are commonly utilized to contain process reactions having a controlled positive internal pressure. These processes are subject to drops in pressure, to a level substantially below atmospheric pressure, and, in the absence of vacuum release, such vessels may buckle inwardly undergoing considerable damage and down time.

For a typical system involving the use of rupture discs, the positive pressure limit will be great compared to the negative pressure limit, for example, 5 to 50 pounds per square inch verses −0.5 pounds per square inch guage. However, accurate control of both is important in order to ensure the safety of personnel and equipment and to ensure process preservation, since the opening of a vessel to air can produce product contamination. Therefore, such manufacturing arrangements have often used devices for protection against both overpressure and underpressure, including complex and expensive mechanical vent valves and vacuum breakers.

Rupture disc assemblies providing some protection against both overpressure and excessive vacuum have been developed. Two such assemblies are described by U.S. Pat. No. 4,079,854 and U.S. Pat. No. 4,119,236, both of which patents are owned by applicant's assignee and the disclosures contained therein are incorporated herein by reference. U.S. Pat. No. 4,079,854 is typical of such devices and comprises a domeshaped relief disc, a flexible seal nested therein, a support structure retaining the flexible sealing disc in an orientation projecting toward the relief disc, and a knife blade seated on the opposite side of the support structure from the seal. The cutting member, having an elongated sharpened blade edge, is positioned in axially spaced relation from the seal and extends a substantial transverse distance thereacross, with a stay arrangement preventing contact between the knife blade and the flexible seal until rupture of the seal is desired. The stay arrangement is designed to have a resistance to bending or plastic deformation sufficient to maintain the seal out of contact with a blade edge only up to a predetermined, and relatively small, differential pressure applied in the appropriate direction. However, when the appropriate pressure is applied, the sealing disc forces the support structure to invert, and is cut by the knife blades, thus opening up a channel to permit fluid flow through the rupture disc assembly.

In practice, rupture discs of the above described type react very well when a large positive pressure is placed upon them in the direction of the concave surface of the relief disc, and they also rapidly invert and rupture when opposite, relatively small, pressures are applied in the direction of the convex face of the relief disc. However, with these devices, once the rupture mode involving the use of the knife blades has taken place, equilibration of the pressure between the inside and the outside of the vessel has been found to be relatively slow. This is believed to be due to the previously unresolved but inherent problem of the cut sealing disc continuing to substantially block passage of fluid through the rupture disc assembly by being supported partially across the opening by the inverted support structure. That is, the inversion pressure differential is insufficient to "snap" the petals past the support, thus, they often "hang up" with the result that they partially block the passage and reduce the equilibration between the ambient or vent pressure and the vacuum in the vessel being protected by the assembly. The major problem with this is that less rapid equilibration can take place and damage to the reaction vessel is more likely because the length of time over which the unsafe condition exists is extended.

Another problem with conventional rupture disc assemblies is that their stay structures have included multiple unassociated appendages which have not necessarily all inverted at the same time. This has resulted in instances of pre-pressure-limit cutting of the seal member and therefore premature opening of the reaction system.

Still another problem with those conventional "two-way" rupture disc assemblies has been that the knife blade assemblies have required expensive and time consuming center welding in order to provide for support of the tip of the knife blade over the center of the opening in the rupture disc. This configuration was considered necessary in order to ensure maximum contact with the sealing member and therefore the greatest amount of cutting.

One limit on possible knife blade configurations has been that cutting patterns which create loose fragments should be avoided, so that portions of the sealing disc do not fall into the reacton vessel.

OBJECTS OF THE INVENTION

The principal objects of the present invention are: to provide a safety pressure relief assembly, of the rupture disc type, which is effective to block flow through a passageway within a predetermined, controlled range having limits extending above and below zero differential pressure; to provide such an arrangement wherein the differential relief pressure in a first direction can be substantially greater than the differential relief pressure in an opposite, second direction; to provide such an arrangement wherein, upon rupture by an appropriate second pressure differential in the second direction, relatively large openings in the rupture disc assembly are created permitting rapid flow of fluid therethrough to rapidly equilibrate pressure between the two sides of the rupture disc; to provide such an assembly in which the second pressure causes a sealing disc to be cut into a support structure silhouette portion and petal portions, the petal portions being foldable out of the path of the fluid flow to leave relatively large cross-sectional areas through which fluid may rapidly flow to facilitate the equilibration; to provide such an assembly having knife blades mounted therein for cutting the sealing member, when the sealing member is subjected to the second pressure, in which the knife blades are arranged in a pattern defining a petal receiving region or volume and a stay structure receiving region or volume and in which the knife blades do not cut the sealing member into loose pieces; to provide such a device in which the knife blades are welded to an outer periphery of the rupture disc assembly and do not contain substantial central weldings; to provide such an assembly which is low in cost compared to alternate devices, but reliable and functional even after being exposed to considerable cycling at less than bursting differential pressures; and to provide such an assembly which is easy to deploy, inexpensive to manufacture, and extremely well suited for its intended purpose.

Other objects and advantages of this invention will become apparent from the following description taken in conjuction with the accompanying drawings wherein are set forth, by way of illustration and example, certain embodiments of this invention.

SUMMARY OF THE INVENTION

A safety pressure relief assembly is provided for protection of reaction vessels against excessive pressure differentials, between the inside and the outside of the vessel, beyond predetermined ranges relative to positive pressure and vacuum within the vessel. The assembly is particularly adapted for protection of the vessel and reaction mixture against a predetermined first pressure in one direction and a different, predetermined second pressure in a second direction; that is, typically protecting against a relatively high positive guage pressure in the vessel or alternatively against a partial vacuum within the vessel producing a net positive pressure differential directed into the vessel. Normally, the second or vacuum pressure differential for which protection is desired is relatively small compared to the pressure differential resulting when the vessel is pressurized to near the high presure limit of the vessel. Upon rupturing of the assembly, under pressure from the direction in which it is desired that rupturing occur at a relatively low pressure differential, the assembly provides for the opening of large channels through which fluid, such as air, can rapidly flow, so that equilibration of pressure between the inside of the vessel and the atmosphere will be rapid.

In one embodiment, the assembly has a stratified or composite structure involving three nesting layers and a cutting member. The first strata or layer comprises a relatively rigid relief disc having an outer periphery and a central domed portion with a concave side and a convex side. The relief disc normally has slits or slots therein, weakening it to burst under a predetermined positive differential pressure applied to the concave side. The relief disc also has apertures therein to permit the passage of fluid, such as air, therethrough under a second positive differential pressure applied to the convex side, especially where there is a partial vacuum on the concave side of the relief disc.

The second layer is a flexible sealing disc having an outer periphery and a central domed portion with a convex side and a concave side. The sealing disc is normally mounted in the assembly with the convex side of the domed portion nested within the concave side of the relief disc, and with their outer peripheries overlapping for mounting. The thin, flexible sealing member seals the cavity or passageway, within which the rupture disc assembly is mounted, to prevent the passage of fluid therethrough until the assembly has burst in one direction or the other. In one mode of operation, the sealing member and relief disc simultaneously burst under a predetermined, and relatively high, positive differential pressure applied to the concave side of the sealing disc. In a second mode of operation the domed member of the sealing disc inverts under a relatively low pressure differential, especially when a partial vacuum is present within the vessel to be protected.

The third layer of the composite disc assembly is a support member having a stay structure. The support member is composed of a relatively rigid material and has an outer circumferential periphery and a central stay portion. The central portion, which forms the stay structure, has a domed configuration, with a center supported, over the center of a plane, generally defined by the outer periphery, by three narrow arcuate generally equally spaced appendages extending between the center and the outer periphery. It, therefore, has a configuration of a domed three-fingered frame with large gaps between each of the three fingers and with a concave side and a convex side. The support member is mounted within the assembly with the convex side nested within the concave side of the sealing member to support the sealing member in an orientation generally abutting the relief disc. The support member domed portion is at least partially invertible under a predetermined differential pressure applied between the concave and the convex side of the sealing disc. For the predetermined pressure to result in inversion of the dome, the greater pressure must be on the convex side thereof and is normally resultant from fluid pressure of gas flowing through the apertures in the relief disc toward a partial vacuum in the vessel. Preferably, the center of the domed portion has an aperture therein to aid in smooth, predicatable inversion.

The cutting member has an outer periphery and a central knife blade portion. Three knife blades are attached by welding or the like to the outer periphery and are supported over the center of the assembly with knife blade edges facing the sealing member. The knife blades define a cutting pattern narrowly outlining the central domed portion of the support structure; and, the knife blades each have a relatively high central point, that is projecting upward toward the dome, and tapering ridge.

In operation, the assembly prevents fluid communication between the inside of the vessel and the outside, which is typically the atmosphere, until predetermined pressure differential rupture limits have been reached. If the pressure differential is in the direction of the concave side of the sealing member and relief disc, that is directed outwardly from the vessel, the assembly will operate in a conventional forward opening rupture disc manner to permit passage of the fluid past the knife blade and the support structure, which do not appreciably block the passageway, and through the ruptured members after rupture. Normally, this mode of operation involves a relatively large predetermined differential pressure and typically opens to protect a pressure vessel from excess internal pressurization for safety reasons. For purposes of orientation, the opening of the relief disc under excessive internal pressure in the vessel, is indicated as toward downstream or forward, with the opposite direction being upstream. This is, the outside of the vessel is downstream and the inside is upstream, by convention, regardless of whether the actual fluid flow is into or out of the vessel.

Should a sudden pressure change occur with a positive differential force being exerted against the convex side of the relief disc, that is oppositely to the above described pressure, fluid, such as air, will pass through the apertures in the relief disc, encounter the sealing member and simultaneously invert the sealing member and the stay structure. As the stay structure inverts, or snaps-over, the narrow appendages become recessed between the knife blades of the cutting member, and the sealing member will impact upon the cutting member and be cut thereby. The cutting pattern of the knife blades causes the sealing disc to be cut into petal portions and a stay structure silhouette. The stay structure silhouette portion is relatively small compared to the cross section of the vent in which the assembly is mounted. The stay structure silhouette portion engages the stay structure and will continue to be supported across the passageway, after rupture of the disc, to prevent pieces of the silhouette portion from being torn loose and carried down the vent.

The petal portions, on the other hand, because they are unsupported by the stay structure fold through the gaps within the knife blades and generally fold back snugly and abuttingly against the vent to thereby allow large spaces or channels for the fluid to pass through. The large channels permit rapid equilibration of pressure between the two sides of the assembly, after rupture, thus allowing for a quick pressure relief. All of the petals, generally, fully open at low reverse rupture differential pressures resulting in the relatively rapid equilibration between opposite sides of the assembly after rupture. This improvement over prior art devices helps ensure a safer, more efficiently operating, system.

For most applications, the rupture disc assembly is mounted within a passageway communicating between two otherwise isolated fluid holding structures, such as tanks or other pressure vessels, or one isolated fluid holding structure and the atmosphere. The assembly is normally oriented with the dome of the relief disc projecting toward the direction in which rupturing under a high differential pressure is desired, that is, convex side oriented forward or downstream, and projecting away from the pressure vessel or the like being protected. Typically, the relief disc projects away from the inside of a reation vessel and toward the ambient atmosphere side of a vent; however, it is foreseen that in some applications a reverse orientation of the rupture disc assembly may be desired.

Alternatively, a composite disc assembly may have four layers including a slit or slotted protecting membrane positioned between the relief disc and the sealing member. The membrane does not add appreciably to the rupture limit of the assembly in either direction; however, it prevents the sealing member from coming into direct contact with the relief disc and possibly being weakened by either creep through the apertures, since the system is normally under a certain amount of positive differential pressure against the convex side of the relief disc, or from splinters, such as metallic splinters, near the slots in the relief disc. The slits or slots in the protective member are preferably aligned with respect to the relief disc in such a manner that they do not overlap either the apertures or the slots therein. This orientation ensures that the sealing member does not directly abut either the slits or the apertures in the relief disc.

The drawings constitute a part of this specification and include exemplary embodiments of the present invention and illustrate various objects and features thereof. In the drawings, material thickness is often shown greatly exaggerated for purposes of illustration.

BRIEF DESCRIPTION OF THE DRAWINGS

FIG. 1 is a vertical cross-sectional view of a safety pressure relief assembly, embodying this invention, mounted in combination with a vent system.

FIG. 2 is an exploded perspective view on a reduced scale, showing elements of the assembly, before rupture.

FIG. 3 is an exploded perspective view on a reduced scale, showing elements of the assembly, following rupture.

FIG. 4 is a perspective view on a reduced scale of the assembly with portions broken away to show internal details.

FIG. 5 is a top plan view on a reduced scale of the assembly with portions broken away to show internal details.

FIG. 6 is a vertical cross-sectional view on a reduced scale of the assembly, taken generally along line 6—6 of FIG. 5 and showing elements of the assembly following rupture.

FIG. 7 is an exploded perspective view showing various elements of a modified pressure relief assembly according to the invention.

DETAILED DESCRIPTION OF THE ILLUSTRATED EMBODIMENT

Figure 8:
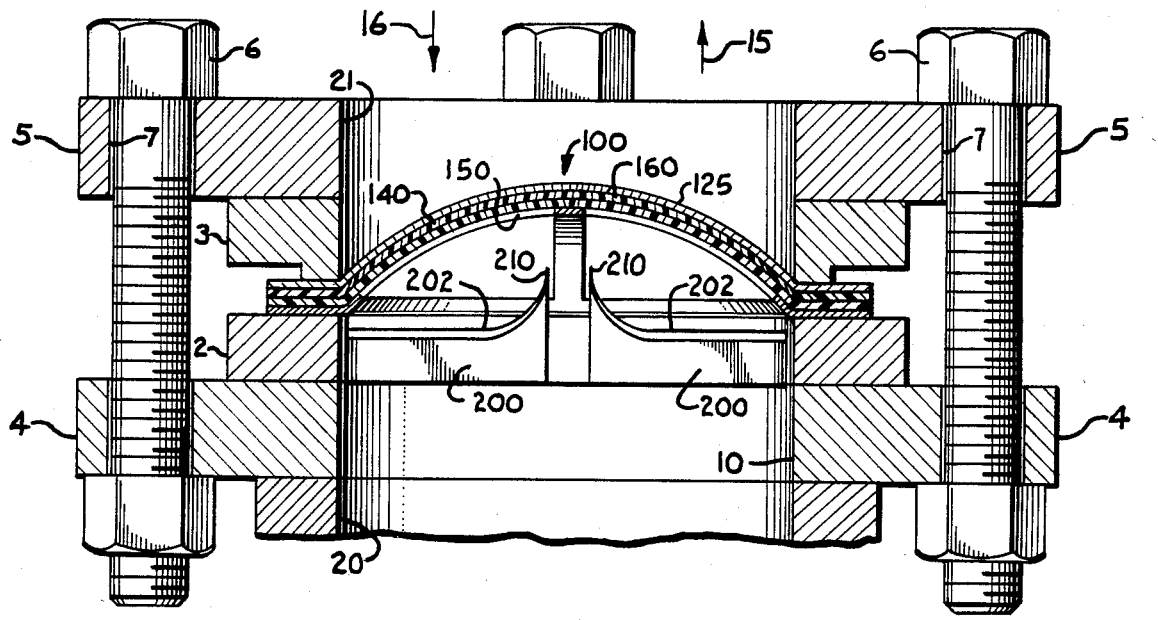
FIG. 8 is an enlarged, vertical cross-sectional view of the modified assembly, shown mounted in a vent system.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a first embodiment of a safety pressure relief assembly embodying the present invention. The assembly 1 is shown, FIG. 1, mounted in conjunction with a mounting structure including inlet and outlet annular supporting rings 2 and 3 which are, in turn, clamped between a pair of conventional annular pipe flanges 4 and 5. Mounting is secured by a plurality of bolts 6 inserted through openings 7 in the flanges 4 and 5 and positioned in spaced relationship about the periphery of the supporting rings 2 and 3. In this manner, the assembly 1 is held firmly in place, extending across a vent or relief passageway 10, which communicates with a vessel (not shown). It is to be understood, however, that other types of mounting arrangements may be used without departing from the scope of this invention.

The assembly 1 normally blocks flow through the pressure relief passageway 10, which communicates between a pressure vessel or the like, not shown, and the atmosphere. The assembly 1 is positioned to protect a vessel in communication with the passageway 10, by channel 11, against both overpressure and excessive vacuum conditions in the vessel. In the embodiment shown, flow out of a protected vessel, when the assembly 1 is ruptured, is indicated by arrow 15 and is termed positive or forward pressure. Flow into a protected vessel, when the assembly 1 is ruptured, is indicated by arrow 16 and is termed reverse or negative pressure. Until one of two predetermined rupturing differential pressures has been reached, the assembly 1 completely blocks the passageway 10 preventing flow of fluid, such as air, in either direction, and potentially may have a pressure differential between inlet side 20 and outlet side 21 of the passageway 10. As used herein, arrow 15 is defined as pointing from upstream toward downstream, regardless of the actual direction of fluid flow.

Referring to FIG. 2, the assembly 1 comprises a relief disc 25 of the forward rupturing type similar to that shown in U.S. Pat. No. 4,079,854 and having an outer circumferential periphery or flange portion 26 and a concave-convex portion or dome 27 connected to the flange portion 26. As used herein, the term "forward" means in the direction of arrow 15 in FIG. 1 and "reverse" means in the direction of arrow 16 in FIG. 1 relative to the assembly 1, but as the assembly 1 can be reversed in the vent system 10 the terms "forward" and "reverse" do not relate to vent system 10 per se, but to the direction of opening of the relief disc 25. In this example, the flange portion 26 is planar, however, other flange configurations, such as a 30 degree seat or some other angular seat types, may be used without departing from the scope of this invention.

The dome portion 27 has a convex side 28 and an opposite concave side 29, and includes slits 30 therein radiating outwardly, from a central area 31 of the relief disc 25, to locations near the annular flange portion 26, thereby defining a plurality of sector shaped leaves 32 such that, upon forward rupture, not shown, in the direction of arrow 15, tearing takes place within the central area 31, allowing the dome portion 27 to burst open in a direction away from a vessel being protected. The relief disc 25, in this embodiment further has a plurality of openings or apertures 33, through the sector shaped leaves 32, permitting rapid fluid flow past the concave-convex portion 27, in either direction, without rupture, in the absence of a sealing disc 40 described below.

The sealing disc 40 is constructed from one of a variety of gas impervious, flexible, easily deformable and relatively flimsy materials, including synthetic resin polymers, such as 0.001 to 0.005 inch thick tetrofluoroethylene such as is sold under the trademark Teflon. The disc 40 preferably has relatively little resistance to deflection under pressure differentials in the rupture range desired and should not be subject to substantial fatigue upon being slightly deformed in response to a large number of pressure reversing cycles or pulses. Under certain conditions, very thin metal stock may meet the necessary requirements.

The sealing disc 40 has an annular and planar circumferential flange portion 41 and a central dome or concave-convex portion 42 flexibly attached to the flange portion 41. The concave-convex portion 42 has an apex 43. During assembly, the annular flange portion 42 is usually at least partially coextensive with the relief disc flange portion 26. However, it is foreseen that, if desired, suitable gaskets or sealing materials may be located therebetween.

During assembly and normal operation, FIG. 1, the sealing disc concave-convex portion 42 is nested into the concave side 29 of the relief disc 25, thereby blocking the apertures 33 to prevent flow therethrough in the foward direction 15. The relief disc 25 and the sealing disc 40, together, resist positive differential pressure in the passageway 10, in direction 15, up to a predetermined pressure at which time both will substantially simultaneously burst in a downstream direction.

The assembly 1 includes a sealing disc support member 50 which serves to support the flexible sealing disc concave-convex portion 42 in its proper nesting relationship with respect to the relief disc 25. The support member 50 may be constructed of various materials, including selected metal and synthetic resin polymers. It should, however, possess the desired resistance to inversion or snap-over. The support member 50 has an annular and generally planar flange 51, preferably at least partially coextensive with the sealing disc flange portion 41, and has a central dome or concave-convex portion 52 flexibly attached to the annular flange 51. In the example shown, the support member concave-convex portion 52 has a central portion 53 and three narrow circumferentially equally spaced appendages 54 which support the central portion 53 within the support member 50. The central portion 53 includes a supporting lip or ring 55 mounted on the flange 51. The central portion 53 and the narrow appendages 54 comprise a stay structure 60 which is domed and which is at least partially invertible, under a predetermined differential pressure applied against the sealing disc 40 in the direction of arrow 16, FIG. 1. The stay structure 60 preferably has all of its members of the narrowest possible construction commensurate with providing adequate support, and has the appropriate propensity for inverting when a preselected force is applied thereto. The configuration of the stay structure 60 provides for large spaces 61 between the appendages 54 which, as described below, will eventually provide large open channels for fluid flow upon rupture of the assembly 1 by pressure in the direction of arrow 16. An aperture 62 may be provided in the center 53 to facilitate this inversion.

In the embodiment shown in FIGS. 1-6, the narrow appendages 54 are spaced approximately 120 degrees apart from one another. It is to be understood, however, that alternate geometries for the structure of the stay structure 60, which would be consistent with the described invention, are possible.

Referring to FIG. 2, a cutting member 75 is suitably mounted, as by welding, on the inlet ring 2 and includes blades 76 having cutting edges 77. The cutting edges 77 are oriented toward the sealing disc 40. Each blade 76 includes a crown 78 and two tapering ridges 79.

The blades 76 define a cutting pattern narrowly outlining the stay structure 60 of the support member 50. In the embodiment shown, FIG. 2, there are three blades 76, each bent at approximately a 120 degree angle 85, mounted in the support ring 22, thus defining a stay structure receiving area 86 and three sealing disc petal recieving or passage areas 87. It is to be observed that different geometries of stay structures will necessitate different cutting patterns for the blades and, accordingly, will generate different stay structure receiving areas and petal receiving areas. However, it will generally be the case that the petal receiving areas occupy more volume than the stay structure receiving area for reasons which will become apparent from the description below.

The support member 50 is positioned with respect to the cutting member 75 in such a manner that when the stay structure 60 inverts, FIG. 3, the stay structure 60 will be recessed between the narrowly outlining blades 76. Proper orientation of the support member 50 relative to the cutting member 75 is assured by engagement of circumferentially spaced apertures 90 in the flange portion 51 of support member 50 with pins 91 mounted on the inlet support ring 2. Similarly, the other components of the assembly 1 are appropriately positioned by engagement between apertures 92 and 93 on sealing disc 40 and relief disc 25 respectively. The pins 91 are preferably not symmetrically positioned, so that inadvertent misalignment of the elements of the assembly 1 is avoided.

While the present embodiment shows the cutting member 75 comprising blades 76 mounted directly on the annular ring 2, it is foreseen that the blades 76 could be mounted in a separate and distinct member from the annular ring 2.

In use, the layered assembly 1, described above, is clamped into the passageway 10, with the relief disc 25, the seal member 40 and the support member 50 tightly squeezed together, FIG. 1. Operation of the assembly 1 under reverse differential pressure, shown by arrow 16, such as when a strong vacuum occurs in a vessel being protected, is as follows. Force is exerted against the unruptured sealing disc concave-convex portion 42. The flexible portion 42 is prevented from inversion by the stay structure 60, up to a predetermined pressure differential limit. When that limit is reached, however, the stay structure 60 will reverse buckle, or snap-over, so as to be inverted and recessed between the cutting blades 76 of the cutting member 75, FIGS. 3 and 6. In the assembly 1, the blades 76 are positioned sufficiently close to the sealing disc 50 so that when the inversion of the stay structure 60 occurs, the sealing disc concave-convex portion 42 will impact the cutting blades 76 and be cut thereby into petal portions 95 and a stay structure silhouette 96, FIG. 3. The force exerted on the petal portions 95, preferably pushes same through the receiving areas 87 and toward the walls of the inlet side 20 of the passageway 10. This opens the receiving areas 87 as channels, through which rapid fluid flow can occur to equilibrate pressure on opposite sides of the ruptured assembly, FIGS. 3 and 6. Preferably, the petal portions 95 snugly engage or abut against the vent passageway 10 on the upstream side thereof. The stay structure silhouette 96, however, will continue to be suspended in the passageway 10, since it is supported therein by the inverted stay structure 60. Because only a relatively small amount of the passageway 10 will be blocked by the stay structure 60, and the silhouette 96, high flow and rapid equilibration are achievable. Additionally, the inverted stay structure 60, FIG. 3, supports the silhouette portion 96 and helps to prevent it from breaking off and falling into the vessel.

Rupture of the assembly under pressure in the direction indicated by arrow 15 is in a manner similar to that for conventional forward opening rupture disc assemblies as represented by U.S. Pat. No. 4,079,854.

Figure 9:
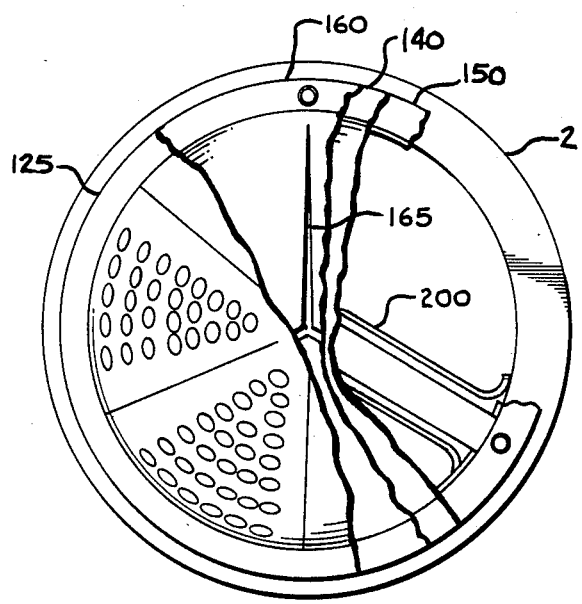
FIG. 9 is a top plan view of the modified assembly with portions broken away to show details thereof.
Figure 10:
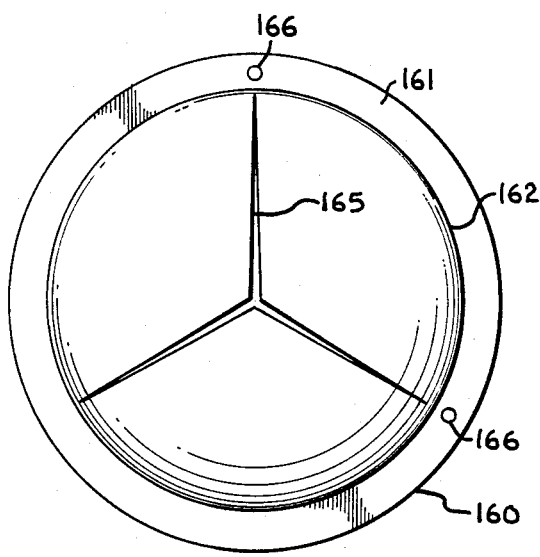
FIG. 10 is a top plan view of protective member of the modified assembly.

In FIGS. 7 through 10, an alternate embodiment of a presure relief assembly according to the present invention is shown and generally designated by the numeral 100. Much of the assembly is identical to, or analogous to the previous embodiment described above. The assembly 100 is shown supported in a passageway 10, FIG. 8, by compression between inlet and outlet supporting rings 2 and 3 respectively, and held in place by pipe flanges 4 and 5, in a manner substantially the same as shown in FIG. 1, and described above, for the previous embodiment. Identical reference numerals indicate the same pipe and channel parts performing essentially the same function. The assembly 100 includes a relief disc 125, a sealing disc 140 and a support member 150 which are constructed, and operate, in a manner analogous to that described for the previous embodiment described above, except for the presence of a protecting member 160, described below. The assembly 100 is shown mounted for use in FIG. 8.

The alternate embodiment includes the slit protecting member 160 having an annular flange 161 and a dome or concave-convex portion 162, FIG. 7. The protecting member 160 is composed of a highly flexible substance, such as a synthetic resin polymer, and is mounted between the sealing disc 140 and the relief disc 125. Slits 165 in the member 160 ensure that the rupture strength of the assembly 100 is not appreciably affected by the presence of the member 160. The member 160 is oriented, by apertures 166, so that the slits 165 overlap neither slits 180 nor apertures 183 in the relief disc 125. In the embodiment shown, the protecting member slits 165 are overlapped by a portion 189 of the relief disc 125 between the slits 180 and the apertures 183.

The protecting member 160 serves to prevent the sealing disc 140 from coming into contact with the relief disc 125 in the area of the apertures 183 and the slits 180. This helps prevent the weakening of the sealing disc 140, and ultimately premature rupturing, due to creep throught the apertures 183 or the slits 180, or due to splinters or other imperfections which may be present on the relief disc 125.

In use, when sufficient pressure is applied to the support member 150 for snap-over, both the sealing member 140 and the protecting member 160 impact the cutting member and are cut thereby into petal portions and silhouettes.

It is foreseen that the assembly 100, utilizing the protecting member 160, could be used in conjunction with a cutting member similar to that described for the preferred embodiment, assembly 1. However, in FIGS. 7 through 10 an alternate cutting member 200 is shown. The cutting member 200 is suitably mounted, as by welding, on the inlet supporting ring 2 and includes blades 201 having cutting edges 202. The cutting edges 202 are oriented toward the sealing disc 140. Each blade 201 includes a crown 210, two tapering ridges 211 and two curved portions 212. The blades 201 operate in the same manner as described for the blades 76 for the preferred embodiment, assembly 1 with the added feature that the blades 201 help cut the sealing member 140 at a portion of the sealing member 140 in close proximity to the mounting ring 2. The curved portions 212 provide a stronger system since more surface area of the blades 201 is available for welding to the inner surface of the annular ring 2, than is available for blades 76 in assembly 1. Also, it is believed that such a curved portion 212 helps the blades 201 to resist bending or twisting when impacted by the sealing member 140. It is foreseen that this geometry and method of attachment of blades of the annular ring 2 may be utilized in conjunction with the invention as disclosed in the above described preferred embodiment. It is also foreseen that the blades 201 could be welded in a ring (not shown) separate from the annular ring 2.

If desired, a suitable seal (not shown) of thin, weak material may be placed within the passageway 10 to protect portions of the assembly 1 or 100 from corrosive or other adverse effects of moisture or chemicals, which may be present within the pressure vessel during normal operation. Such seals are known in the industry and do not appreciably affect the operation of the assembly except in the very lowest operational ranges, where other precautions to protect the assembly may be indicated.

It is to be understood that while certain forms of the present invention have been illustrated and described herein, it is not to be limited to the specific forms or arrangement of parts described and shown.

What is claimed and desired to be secured by Letters Patent is as follows:

1. A pressure relief assembly for mounting in a vent; said assembly comprising:
    (a) a forward opening relief disc having at least one aperture therethrough; said disc forward rupturing upon application of a first preselected differential pressure thereto in a forward direction;
    (b) a sealing disc positioned adjacent said relief disc; said sealing disc cooperating with said relief disc to operably prevent forward flow of fluid past said assembly, until rupture of said sealing disc;
    (c) a sealing disc support member positioned adjacent said sealing disc and cooperating with said sealing disc to operably prevent reverse flow of fluid past said assembly until rupture of said sealing disc; said support member including a flexible support stay structure operably supporting said sealing disc against a second pressure differential acting in said reverse direction until said second pressure differential reaches a second preselected pressure differential;
    (d) a sealing disc cutting member positioned in cooperation with said sealing disc support member;
        (i) said cutting member comprising a knife blade arrangement positioned so as to cut and rupture said sealing disc when said second preselected pressure differential is applied to said assembly so as to flex said support member stay structure and allow said sealing disc to engage said knife blade arrangement; said support stay structure being operably postioned between said sealing disc and said cutting member prior to said second preselected differential pressure being applied to said assembly; and
    (e) said knife blade arrangement being aligned so as not to engage said stay structure but to cut said sealing disc so as to result in a ruptured sealing member petal and a ruptured sealing member silhouette portion, said silhouette portion being similar in configuration to said stay structure and said petal being hingedly connected to a remainder of said sealing member; said petal not engaging said stay structure after rupture of said sealing member so as to allow said petal to swing into a position to provide for flow of fluid past said assembly and rapid equilibration of pressure on opposite sides of said assembly.

2. An assembly according to claim 1 wherein:
    (a) said knife blade arrangement includes knife blades narrowly outlining said stay structure, when said second preselected pressure differential is applied.

3. An assembly according to claim 1 wherein:
    (a) said relief disc has a domed configuration with concave and convex sides, said convex side facing in said forward direction;
    (b) said sealing disc has a domed configuration with concave and convex sides, said convex side being nested within said relief disc concave side; and
    (c) said support member stay structure has a domed configuration with concave and convex sides, said convex side being nested within said sealing disc concave side.

4. An assembly as set forth in claim 1 wherein:
    (a) said support member includes an outer periphery and said support stay structure; said stay structure comprising a central portion and an appendage portion, said central portion being generally supported at a center of said support member by said appendage portion.

5. An assembly according to claim 4 wherein:
    (a) said appendage portion comprises narrow appendages circumferentially spaced about said support member and connecting between said central portion and said outer periphery.

6. An assembly according to claim 5 wherein:
    (a) said narrow appendages comprise three narrow appendages circumferentially spaced approximately 120 degrees apart from one another.

7. An assembly according to claim 1 for mounting a vent passageway communicating with a vessel, in operational combination with a mounting structure comprising:
    (a) an inlet pipe flange positioned about said passageway and defining a portion thereof;
    (b) an outlet pipe flange positioned about said passageway and defining a portion thereof;
    (c) an inlet supporting member;
    (d) an outlet supporting member;
    (e) wherein said assembly is adapted to be operationally supported across said passageway, between said supporting members, by said flanges, with said flanges compressing said supporting members and said assembly therebetween; said assembly sealing the passageway to fluid flow therethrough up to preselected pressure differentials between opposite sides of said assembly.

8. A pressure relief assembly for mounting in a vent; said assembly comprising:
    (a) a forward opening relief disc having a domed configuration with concave and convex sides; said disc forward rupturing upon application of a first preselected pressure thereto;
    (b) a sealing disc positioned adjacent said relief disc; said sealing disc having a domed configuration with concave and convex sides, said convex side being nested within said relief disc concave side; said sealing disc cooperating with said relief disc to operably prevent forward flow of fluid past said assembly, until rupture of said sealing disc;
    (c) a sealing disc support member positioned adjacent said concave side of said sealing disc and cooperating with said sealing disc to operably prevent flow of fluid past said assembly until rupture of said sealing disc; said support member including a domed stay structure supporting said sealing disc against a second pressure acting against said sealing disc convex side, until said second pressure reaches a second preselected pressure differential; said stay structure having convex and concave sides, said convex side being nested within said sealing disc concave side;

(i) said support stay structure comprising a central portion and an appendage portion, said central portion being supported over a center of said support member by said appendage portion;

(d) a sealing disc cutting member positioned to act in cooperation with said sealing disc support member and on said support member concave side;

(i) said cutting member comprising a knife blade arrangement positioned so as to cut and rupture said sealing disc when said second preselected pressure differential is applied to said assembly so as to flex said support member stay structure and allow said sealing disc to engage said knife blade arrangement; and (e) said knife blade arrangement being aligned so as not to engage said stay structure upon buckling of said sealing disc but to cut said sealing disc so as to result in a ruptured sealing member petal and a ruptured sealing member silhouette portion, said silhouette portion being similar in configuration to said stay structure said petal not engaging said stay structure and said petal being hingedly connected to a remainder of said sealing member to allow said petal to swing into a position to allow flow of fluid past said assembly so as to provide for rapid equilibration of pressure on opposite sides of said assembly;

(i) said knife blade arrangement comprising knife blades narrowly outlining said stay structure.

9. A pressure relief assembly for mounting between inlet and outlet supporting members; said assembly comprising:

(a) a relief disc having a concave-convex portion with apertures therein;

(b) a sealing disc of greater flexibility than said relief disc; said sealing disc having an outer periphery and a central concave-convex portion with the convex side thereof nested into the concave side of said relief disc concave-convex portion; said sealing disc preventing fluid flow past said relief disc only up to a predetermined first pressure applied to the concave side of said sealing disc when said fluid flow is in a direction from the concave side of said relief disc to the convex side;

(c) a flexible sealing disc support member having a curved stay structure projecting into close proximity to the concave side of said sealing disc concave-convex portion;

(i) said curved stay structure being partially invertible under a predetermined second pressure, applied to the convex side of said sealing disc, to project in a direction away from said relief disc; and (d) a sealing disc cutting member having an outer periphery and cutting blades positioned in spaced relation from the concave side of said sealing disc central portion and said stay structure, said stay structure being between said cutting member and said sealing disc prior to buckling thereof;

(i) said blades having cutting edges extending a substantial part of the transverse distance across said sealing disc concave-convex portion and facing same;

(ii) said blades having a cutting pattern defining a stay structure receiving area and a separate sealing member petal receiving area;

(e) said stay structure having a resistance to deflection only sufficient to retain said sealing disc nested into the concave side of said relief disc, and out of contact with said blades, up to said second pressure;

(i) said second pressure partially inverting said support member; said inverted stay structure nesting within said stay structure receiving area and between said blades;

(ii) said second pressure inverting said sealing disc concave-convex portion to project away from said relief disc and to impact said blade cutting edges; said impact cutting said sealing disc concave-convex portion into petal portions and a stay structure silhouette, said petal portions and said silhouette being flexibly attached to said sealing member outer periphery;

(iii) said second pressure forcing said silhouette to overlap said inverted stay structure and to be supported thereby;

(iv) said second pressure forcing said petal portions to be folded through said petal receiving area so as not to engage said stay structure to open same to the rapid passage of fluid therethrough;

(f) whereby when said relief assembly is subjected to said second pressure, said sealing member is cut and said petals fold out of blocking engagement with said assembly to permit rapid flow of fluid through said assembly and to equilibrate pressure between opposite sides thereof.

10. The pressure relief assembly as set forth in claim 9 wherein:

(a) said support member stay structure has a peripheral rim and a central portion with three narrow appendages extending radially outwardly therefrom and connecting with said rim;

(i) said appendages supporting said central portion, and forming a generally concave-convex geometry therewith, to support said sealing disc nested into said relief disc concave portion before said second pressure has been applied to said assembly; and (b) said blades narrowly outline said stay structure for receipt of same therebetween, under said second pressure, and to cut said petals and said silhouette out of said sealing member.

11. The pressure relief assembly as set forth in claim 9 wherein:

(a) said support member stay structure close proximity is supporting engagement; and (b) said relief disc, said sealing disc and said support member each have an annular mounting flange at least partially coextensive with each other.

12. The pressure relief assembly set forth in claim 10 wherein:

(a) said appendages extend outwardly from said central portion in directions approximately 120 degrees apart from one another.

13. The pressure relief assembly set forth in claim 12 wherein:

(a) said central portion includes an aperture therethrough.

14. An assembly according to claim 9 including:

(a) a flexible, slotted sealing member protection disc positioned between said sealing disc and said relief disc;

(i) said slotted disc inverting, being cut, and folding analogously to said sealing disc when said second pressure is applied to said assembly.

15. The pressure relief assembly set forth in claim 9 wherein:

(a) said sealing disc has an apex portion located near a center of said concave-convex portion; and (b) each of said blade cutting edges has a crown portion and a lower ridge portion;
  (i) said crown portion having a substantially pointed tip located substantially adjacent said sealing disc apex portion and spaced apart therefrom;
  (ii) said ridge portion tapering away from said crown portion toward said cutting member outer periphery;
(c) whereby when said sealing member inverts, said sealing member first engages said cutting blades at said crown and is punctured thereby, with sequential cutting by said lower ridge portion to form said petal portions.

16. In a pressure relief assembly for mounting in a vent; said assembly including a reverse buckling sealing disc, a support member and a disc cutting member, the improvement comprising:
(a) said support member having a central stay structure and an outer periphery, said central stay structure including at least one radially extending appendage connecting between said central stay structure and said outer periphery; and
(b) said cutting member includes a knife blade arrangement generally outlining said stay structure; said stay structure central portion being generally positioned between said knife blade and said sealing disc prior to said sealing disc reverse buckling;
(c) whereby when said sealing disc reverse buckles, said knife blades are engaged by said sealing disc and cut said sealing disc into a stay structure silhouette portion and a petal portion such that said petal position does not engage stay structure after reverse buckling of said sealing disc.

17. A pressure relief assembly for mounting between inlet and outlet supporting members; said assembly comprising:
(a) a relief disc having a concave-convex portion with apertures therein;
(b) a sealing disc of greater flexibility than said relief disc; said sealing disc having an outer periphery and a central concave-convex portion with an apex and with the convex side thereof nested into the concave side of said relief disc concave-convex portion; said sealing disc preventing fluid flow past said relief disc only up to a predetermined first pressure applied to the concave side of said sealing disc when said fluid flow is in a direction from the concave side of said relief disc toward the convex side;
(c) a flexible sealing disc supporting member having a curved stay structure projecting into close proximity to the concave side of said sealing disc concave-convex portion;
  (i) said support member stay structure having a peripheral rim and a central portion with narrow appendages extending radially and arcuately outwardly from said central portion and connecting with said rim; said appendages supporting said central portion, and forming a generally concave-convex geometry therewith, to support said sealing disc nested into said relief disc concave portion up to a predetermined second pressure, applied to the convex side of said sealing disc;
  (ii) said curved stay structure being partially invertible under said predetermined second pressure, to project in a direction away from said relief disc;
(d) said relief disc, said sealing disc and said support member each having an annular mounting flange at least partially coextensive with each other;
(e) a sealing disc cutting member having an outer periphery, and cutting blades positioned in spaced relation from the concave side of said sealing disc central portion and said stay structure, said stay structure being between said cutting member and said sealing disc;
  (i) said blades having cutting edges extending a substantial part of the transverse distance across said sealing disc concave-convex portion and facing same;
  (ii) said blades each have a crown portion and a lower ridge portion; said crown portion having a substantially pointed tip located substantially adjacent said sealing disc apex portion and spaced apart therefrom; said ridge portion tapering away from said crown portion toward said cutting member outer periphery;
  (iii) said blades having a cutting pattern defining a stay structure receiving area and a separate sealing member petal receiving area; said stay structure being positioned in the region between said sealing disc and said knife blades prior to reverse buckling of said sealing disc;
(f) said stay structure having a resistance to deflection only sufficient to retain said sealing disc nested into the concave side of said relief disc, and out of contact with said blades, up to said second pressure;
  (i) said second pressure partially inverting said support member so as to produce an inverted stay structure; said inverted stay structure nesting within said stay structure receiving area and between said blades;
  (ii) said second pressure inverting said sealing disc concave-convex portion to project away from said relief disc and to impact said blade cutting edges; said impact cutting said sealing disc concave-convex portion into petal portions and a stay structure silhouette, said petal portions and said silhouette being flexibly attached to said sealing member outer periphery;
  (iii) said second pressure forcing said silhouette to overlap said inverted stay structure and to be supported thereby;
  (iv) said second pressure forcing said petal portions to be folded through said petal receiving area so as not to engage said stay structure after said sealing disc reverse rupture and so as to open said petal portions to permit rapid passage of fluid therethrough;
(g) whereby when said relief assembly is subjected to said second pressure, said sealing member is cut and said petals fold out of blocking engagement with said assembly to permit rapid flow of fluid through said assembly and to equilibrate pressure between opposite sides thereof.

18. The assembly according to claim 17 wherein:
(a) said support member includes three narrow, arcuate appendages spaced approximately 120 degrees apart form one another; and
(b) said knife blades define three petal receiving areas.

19. The assembly according to claim 18 wherein:
(a) each of said knife blades of said cutting member includes opposed curved portions thereon; said curved portions being at radially outward ends of said knife blades; and including
(b) an annular supporting ring having an inner surface; each of said knife blade curved portions snugly engaging said supporting ring inner surface so as to facilitate mounting of said knife blades in said supporting ring.

20. A pressure relief assembly for mounting in a vent and comprising:
 (a) a flexible reverse buckling sealing disc for sealably positioning in a pressure relief vent;
 (b) a stay member positioned adjacent said disc and in supporting engagement with said sealing disc such that said stay member reverse buckles with said sealing member;
 (c) a cutting member positioned in spaced relation to said sealing disc and said stay member and having a knife blade oriented to cut said sealing disc into a petal portion and a stay silhouette portion upon said disc and said stay member reverse buckling;
 (d) said sealing disc petal portion being positioned prior to reverse rupture of sealing disc so as not to overlap said stay member such that upon reverse rupture of said sealing disc said sealing disc and said stay member reverse buckle and said petal portion is at least partially cut from a remainder of said sealing disc by said cutting member and thereafter said petal portion is urged by fluid pressure to flex freely past said knife member without engaging said stay member such that fluid is allowed to flow through said vent without substantial restriction from said petal portion.

* * * * *